US012750626B2

(12) United States Patent
Kamkar-Parsi et al.

(10) Patent No.: US 12,750,626 B2
(45) Date of Patent: Sep. 29, 2026

(54) METHOD FOR DETECTING A DIRECTION OF ARRIVAL OF AN ACOUSTIC TARGET SIGNAL AND BINAURAL HEARING SYSTEM

(71) Applicant: Sivantos Pte. Ltd., Singapore (SG)

(72) Inventors: Homayoun Kamkar-Parsi, Erlangen (DE); Martin Bouchard, Cantley (CA); Sa'di Altamimi, Ottawa (CA)

(73) Assignee: Sivantos Pte. Ltd., Singapore (SG)

( * ) Notice: Subject to any disclaimer, the term of this patent is extended or adjusted under 35 U.S.C. 154(b) by 126 days.

(21) Appl. No.: 18/930,396

(22) Filed: Oct. 29, 2024

(65) Prior Publication Data

US 2025/0056177 A1 Feb. 13, 2025

Related U.S. Application Data

(63) Continuation of application No. PCT/EP2022/083142, filed on Nov. 24, 2022.

(51) Int. Cl.
*H04S 7/00* (2006.01)
*H04R 25/00* (2006.01)

(52) U.S. Cl.
CPC ............... *H04S 7/30* (2013.01); *H04R 25/00* (2013.01)

(58) Field of Classification Search
CPC .................................. H04S 7/30; H04R 25/00
See application file for complete search history.

(56) References Cited

U.S. PATENT DOCUMENTS

2020/0053486 A1 2/2020 Jensen
2021/0020190 A1 1/2021 Hiroe
2022/0159403 A1 5/2022 Sporer et al.

FOREIGN PATENT DOCUMENTS

WO WO-2021023771 A1 * 2/2021 ............ H04S 7/303

OTHER PUBLICATIONS

Varzandeh Reza et al, "Exploiting Periodicity Features for Joint Detection and DOA Estimation of Speech Sources Using Convolutional Neural Networks", ICASSP 2020—2020 IEEE International Conference on Acoustics, Speech and Signal Processing (ICASSP), IEEE,May 4, 2020 (May 4, 2020), p. 566-570, XP033794406, DOI: 10.1109/ICASSP40776.2020.9054754 external link, the whole document.

(Continued)

*Primary Examiner* — Andrew Sniezek
(74) *Attorney, Agent, or Firm* — Laurence A. Greenberg; Werner H. Stemer; Ralph E. Locher

(57) ABSTRACT

A method detects a direction of arrival of an acoustic target signal. A local device contains first and second local microphones, and a remote device contains a first remote microphone. The method includes the steps of: deriving a first local input signal from first and second local microphone signals, deriving a second local input signal from the first and/or second local microphone signals, and deriving a first remote input signal from the first remote microphone. The first and second local input signals and first remote input signal form a part of a set of input signals. A plurality of spatial feature quantities are each derived from different respective pairs, and are indicative of a spatial relation between the two corresponding input signals. The spatial feature quantities are input to a neural network. The direction of arrival of the acoustic target signal is estimated in the neural network.

14 Claims, 5 Drawing Sheets

(56) References Cited

OTHER PUBLICATIONS

Hao Yiya et al, "Spectral Flux-Based Convolutional Neural Network Architecture for Speech Source Localization and its Real-Time Implementation", IEEE Access, IEEE, USA,vol. {0} 8, Oct. 26, 2020 (Oct. 26, 2020), p. 197047-197058, XP011819491, DOI: 10.1109/ACCESS.2020.3033533, abstract, section I., II. and V.;figure 1.

Tashev Ivan Jelev: "Section 6.2 Sound Source Localization from a Single Frame", In: "Sound Capture and Processing: Practical Approaches", Aug. 17, 2009 (Aug. 17, 2009), Wiley Publishing, Chichester, XP093148687, ISBN: 978-0-470-31983-3, pp. 1-389, DOI: 10.1002/9780470994443.

* cited by examiner

METHOD FOR DETECTING A DIRECTION OF ARRIVAL OF AN ACOUSTIC TARGET SIGNAL AND BINAURAL HEARING SYSTEM

CROSS-REFERENCE TO RELATED APPLICATION

This application is a continuation, under 35 U.S.C. § 120, of copending International Patent Application PCT/EP2022/083142, filed Nov. 24, 2022, which designated the United States; the prior application is herewith incorporated by reference in its entirety.

FIELD AND BACKGROUND OF THE INVENTION

The invention is related to a method for detecting a direction of arrival of an acoustic target signal by means of a plurality of microphones, the microphones being distributed over a local device and a remote device, each of the microphones configured to generate a corresponding microphone signal from an environment sound, respectively. The method includes the steps of: deriving a set of input signals, deriving a plurality of spatial feature quantities from the set of input signals, and estimating the direction of arrival of said acoustic target signal on the basis of said spatial feature quantities.

In hearing system applications, such as hearing aids configured to correct for a hearing impairment of a user, often directional signal processing is applied to electric input signals derived by microphones of the hearing aid from an environment sound, in order to enhance a target signal and to attenuate noise in the environment sound. The aim is to provide the user with a higher signal-to-noise ratio (SNR). An application of this type of signal processing, however, is not limited to hearing aids, but also communication devices may profit from directional processing.

In order to efficiently enhance a target signal over a noisy background, as a starting point, often a direction of arrival (DOA) of the target signal (with respect to a reference direction, e.g., a look direction of the wearer when wearing the hearing system as specified for use by the manufacturer) is estimated. To this end, typically, quantities indicative of the spatial cues of the target signal such as level differences and/or time differences of the target signal components in the respective microphone signals of the hearing system, are determined or estimated. However, in a noisy environment and/or situations with more than one target source, estimating the respective target signal components in the microphone signals for a derivation of the level and/or time differences over the different microphone signals is often difficult, in particular in the case of limited processing resources as in (mobile) hearing systems.

U.S. patent publication No. 2022/0159403 A1 provides a system and a corresponding method for assisting selective hearing. The system includes a detector for detecting an audio source signal portion of one or more audio sources by using at least two received microphone signals of a hearing environment. In addition, the system includes a position determiner for allocating position information to each of the one or more audio sources. In addition, the system includes an audio type classifier for assigning an audio source signal type to the audio source signal portion of each of the one or more audio sources. In addition, the system includes a signal portion modifier for varying the audio source signal portion of at least one audio source of the one or more audio sources depending on the audio signal type of the audio source signal portion of the at least one audio source so as to obtain a modified audio signal portion of the at least one audio source. In addition, the system includes a signal generator.

SUMMARY OF THE INVENTION

It is therefore an object of the invention to provide a method for detecting a DOA of an acoustic target signal by means of a plurality of microphones, in particular of a hearing system, that has a high detection/estimation accuracy while being robust against background noise, and preferably being capable of dealing with multiple targets.

With the foregoing and other objects in view there is provided, in accordance with the invention, a method for detecting a direction of arrival of an acoustic target signal by use of a plurality of microphones. The microphones are distributed over a first hearing instrument of a binaural hearing system as a local device and a second hearing instrument of the binaural hearing system as a remote device. The local device contains at least a first local microphone and a second local microphone, and the remote device contains at least a first remote microphone. Each of the microphones is configured to generate a corresponding microphone signal from an environment sound, respectively. The method includes the steps of: deriving a first local input signal by means of a first local microphone signal and a second local microphone signal; deriving a second local input signal by means of the first local microphone signal and/or the second local microphone signal; and deriving a first remote input signal by means of at least a first remote microphone signal, the first local input signal, the second local input signal and the first remote input signal forming a part of a set of input signals. A plurality of spatial feature quantities are derived. The spatial feature quantities are each derived from different respective pairs out of the set of input signals, and being indicative of a spatial relation between two corresponding ones of the input signals. Each of the spatial feature quantities are derived from a respective pair out of the set of input signals by a same mathematical relation and/or algorithm, varying the respective pairs of input signals for different spatial feature quantities. The spatial feature quantities are used as an input to a neural network. By means of the neural network, the direction of arrival of the acoustic target signal is estimated. As the spatial feature quantities, corresponding intra-microphone responses between the respective two input signals out of the set of input signals are derived. Each of the intra-microphone responses are a ratio of cross power spectral densities of an underlying pair of the input signals and of an auto power spectral density of one out of the pair of input signals, or a ratio of cross-correlations of the underlying pair of input signals and of an auto correlation of one out of the pair of input signals.

According to the invention, the object is solved by a method for detecting a direction of arrival of an acoustic target signal by means of a plurality of microphones. The microphones being distributed over a local device and a remote device. The local device contains at least a first local microphone and a second local microphone, and said remote device comprising at least a first remote microphone, each of the microphones configured to generate a corresponding microphone signal from an environment sound.

The method contains the steps of deriving a first local input signal by means of the first local microphone signal and the second local microphone signal, deriving a second local input signal by means of the first local microphone signal and/or the second local microphone signal, and deriving a first remote input signal by means of at least the first remote microphone signal. The first and second local and first remote input signals forming a part of a set of input signals, deriving a plurality of spatial feature quantities. The spatial feature quantities each being derived from different respective pairs out of the set of input signals, and being indicative of a spatial relation between the two corresponding input signals, using said spatial feature quantities as an input to a neural network, and estimating, by means of the neural network, the direction of arrival of the acoustic target signal. Embodiments of particular advantage, which may be inventive in their own right, are outlined in the depending claims and in the following description.

The local device and the remote device form part of a hearing system. In this respect, a hearing system is to be understood as any whatsoever system configured to present a sound signal to a hearing of a user by means of at least one electro-acoustic transducer (such as, e.g., a speaker, a balanced metal-case receiver, or a bone conduction transducer). In particular, the hearing system may be given by a binaural hearing system such as a binaural hearing aid configured to correct a hearing impairment of the user and containing a first and a second hearing instrument (each of which to be worn at another ear) as the local and remote devices, or may be given by a communication system with two devices (such as earplug/-pod-like headphones), each of which to be worn at another ear.

Each of the microphones distributed over the local and the remote device is configured to generate a respective microphone signal from the environment sound. In particular, the first and second local microphone generate a first and second local microphone signal, and the first remote microphone generates a first remote microphone signal. Pre-processing steps such as pre-amplification or A/D-conversion may be absorbed into the microphone signals. Preferably, the respective microphone signal represents acoustic pressure oscillations at the location of the underlying microphone in corresponding voltage and/or current oscillations.

From these microphone signals, a set of input signals is derived. In particular, a first local input signal may be derived from the first and second local microphone signal by means of a beamformer. In particular, the second local input signal may be generated either from the first local microphone signal or from the second local microphone signal, preferably without any signal components from the respective other local microphone signal (i.e., either from the signal components of the first local microphone signal alone, or from the signal components of the second local microphone signal alone). The first remote input signal may be derived from the first remote microphone signal by means of a beamformer, using a second remote microphone signal (generated from the environment sound by a second remote microphone that is comprised in the second remote device), or may be derived from the signal components of the first remote microphone signal alone. The set of input signals may consist of the first and second local input signal and the first remote signal only, or may comprise further input signals.

The advantage of using a beamformer signal as the first local input signal (and possibly, also for the first remote input signal) is that the beamforming allows for a local pre-processing that already may eliminate some noise, in particular directional noise (e.g., from the back hemisphere).

The first and second local input signal and the first remote input signal, and possibly other input signals, form part of the set of input signals. Now, different pairs of input signals are selected out of the set of input signals, and from each of these pairs, a respective spatial feature quantity is derived, the spatial feature quantity being indicative of a relation between the respective two input signals under consideration, so that a plurality of spatial feature quantities is being obtained.

In particular, one spatial feature quantity may be derived from the pair of the first and second local input signal, and another spatial feature quantity may be derived from the pair of the first local input signal and the first remote input signal. The spatial feature quantities shall be indicative of a spatial relation, of the respective pair of input signals used to derive each spatial feature quantity.

The spatial feature quantities, preferably in an adequate representation such as real and imaginary part or magnitude and phase representation for complex-valued quantities, are then used as an input to a neural network, in particular, in the form of an input vector, the vector entries being the spatial feature quantities (or real and imaginary parts thereof). Preferably, the neural network is trained to estimate a DOA of the acoustic target signal from the spatial feature quantities as entries, i.e., to make predictions from the present spatial feature quantities about a possible DOA, based on "learned" spatial feature quantities of known DOAs in given situations.

In particular, the neural network may preferably output a vector with each vector component corresponding to a different angular range as the estimate of the DOA. Then, for a proper normalization, each vector entry preferably may correspond to a probability of a sound source of the acoustic target signal being present in the respective angular range. However, also other estimates for the DOA are possible as output of the neural network, e.g., an angle or a coarse-grained angle or an angular range of maximum likelihood for the DOA.

According to the invention, each of the spatial feature quantities is derived from the respective pair out of the set of input signals by the same mathematical relation and/or algorithm, varying the respective pairs of input signals for different spatial feature quantities. This means that if a first spatial feature quantity $Q_1$ is derived from the pair of the first local input signal Loc1 and second local input signal Loc2 as a function $Q_1$=F(Loc1, Loc2), a second spatial feature quantity $Q_2$ is derived from the corresponding pair of the first local input signal Loc1 and the first remote input signal Rem1 as $Q_2$=F(Loc1, Rem1), i.e., by the same mathematical function F(x, y) of two arguments x and y, changing only (at least) one of the input signals.

In this respect, as the spatial feature quantities, corresponding intra-microphone responses (IMR) between the respective pair of two input signals out of the set of input signals are derived, each of the intra-microphone responses being a ratio of the cross power spectral densities of the underlying pair of input signals and of an auto power spectral density of one out of the pair of input signals, or a ratio of the cross-correlations of the underlying pair of input signals and of an auto correlation of one out of the pair of input signals.

In particular, for the pair of the first local input signal Loc1$(n,k,j)$ and second local input signal Loc2$(n,k,j)$ (n being the frame index, j denoting the discrete time sample within the frame n and k being the frequency band index), the IMR(Loc1, Loc2) may be calculated as $$IMR_{Loc1,Loc2}(n,k)\frac{\sum_{j=0}^{N-1} Loc1*(n,k,j)\cdot Loc2(n,k,j)}{\sum_{j=0}^{N-1}|Loc2(n,k,j)|^2} \tag{i}$$

where Loc1* denotes the complex conjugate, and N denotes the number of samples in the subband k for the frame n. The sum in the above equation may also be substituted by a moving average (e.g., with exponential decay coefficients).

In an embodiment, the first local input signal and/or the second local input signal and/or a third local input signal is derived from the first and second local microphone signal by means of a beamformer applying a first target constraint, and/or wherein the second local input signal or the third local input signal forming part of the set of input signals is derived from the first and second local microphone signal by means of a beamformer applying a second target constraint and/or a first noise constraint. In this respect, a target constraint may be given by an attenuation (determined, e.g., by a corresponding attenuation factor) in the respective target direction, e.g., an attenuation of 0 dB in the direction of 0° (frontal direction), or in another direction such as +/−45° or +/−90°. Likewise, a noise constraint may be given by a null direction for maximum attenuation of noise, e.g., a maximum attenuation (i.e., a gain of zero) in the direction of 180° (rear direction) or some other direction. The absence of a noise constraint in the beamformer for the respective local input signal corresponds to the assumption of diffuse noise. When multiple local input signals with different target constraints corresponding to different target directions are used, this may create additional local input signals.

The beamformer for deriving the first local input signal from the first and second local microphone signal then applies a target constraint, such as 0 dB in the direction of 0°. The beamformer may or may not have an additional noise constraint (fixing a null direction). Additional local input signals, such as a third local input signal, may be derived from the first and second local microphone signal by means of beamforming in a similar way as the first local input signal, just varying the direction of the target constraint (e.g., 0 dB at 15° C.) and possibly adding a noise constraint or (if the first local input signal is also generated from a beamformer with a noise constraint), optionally, varying the direction of the noise constraint.

In particular, the first local input signal is derived from the first and second local microphone signal using the first local microphone signal as a reference for the beamforming performed in the beamformer, and the second local input signal or a third local input signal is derived from the first and second local microphone signal by means of another beamformer, using the second local microphone signal as a reference for the beamforming performed in the other beamformer. This means that the set of input signals comprises at least two local input signals derived from the first and second local microphone signal by means of beamforming, each of which has another of the first and second local microphone signal as a reference signal for the beamforming.

In an embodiment, the first remote input signal and/or an auxiliary remote input signal, the auxiliary remote input signal forming part of the set of input signals, is derived in the local device by using at least the first remote microphone signal and the first local microphone signal. This means that the first remote input signal may also be generated from the first (and possibly the second) remote microphone signal in the local device. To this end, the first and possibly second remote microphone signal is transmitted from the remote device to the local device.

In particular, the first remote input signal, which may be derived from the first and second remote microphone signal by means of a beamformer (be it in the local device or in the remote device), is used together with one of the local signals in another signal processing operation, preferably in another beamforming operation, e.g., with the first local input signal, in order to generate the auxiliary remote intermediate signal. The auxiliary remote input signal, however, or also a further auxiliary remote input signal, may be generated by transmitting the first remote microphone signal from the remote device to the local device, and applying a signal processing operation, preferably a beamforming operation, to the first remote microphone signal and a local signal, e.g., any of the first and second local microphone signals.

Preferably, the first remote input signal or the first remote microphone signal is transmitted from the remote device (in particular, the second hearing instrument) to the local device (in particular, the first hearing instrument), and/or the neural network is implemented in the local device. In particular, in case that the neural network is implemented in the local device (the first hearing instrument), the first remote input signal is transmitted from the remote device to the local device. Most preferably, the DoA is used directly in the local device (i.e., in its signal processing unit) for further signal processing (in particular, direction-sensitive signal processing such as beamforming and the like).

In an embodiment, the direction of arrival of the acoustic target signal is estimated in the local device (in particular, the first hearing instrument). The first local input signal and/or the first local microphone signal is transmitted from the local device to the remote device (in particular, the second hearing instrument), A second remote input signal is derived by means of the first and/or the second remote microphone signal. The direction of arrival of the acoustic target signal is estimated in the remote device instrument by means of the first and second remote input signal and the first local input signal and/or an auxiliary local input signal. The auxiliary local input signal being derived in the remote device by using the first local microphone signal (and the first remote microphone signal). The estimation performed in the remote device is transmitted to the local device, and wherein a final direction of arrival is determined based on the estimation performed in the local device and the estimation performed in the remote device. This comprises that the method may be performed symmetrically, e.g., in the local device by means of the first remote input signal transmitted from the remote device (and the local input signals), and in the remote device by means of the first local input signal transmitted from the local device (and the remote input signals), and a transmission of the DoA estimation obtained in the remote device to the local device, as well as a comparison of the DoA estimation of the remote device with the DoA estimation of the local device. In particular, the final DoA may be an average or a weighted average of the DoA estimations of the local and the remote device. The generation of remote input signals in the remote device may be performed by means of beamforming, in particular using target and/or noise constraints as described above for the beamforming in the local device.

An important aspect of this embodiment is that for a binaural hearing aid with two hearing devices to be worn by a user at his left ear and right ear, respectively, the hearing device on the left side may detect a DoA of a source located to the left side and near the frontal direction, while the hearing device on the right side may detect a DoA of a source located to the right side and near the frontal direction. This way, each hearing device may predict the DoA of a source essentially not attenuated by a head shadowing effect. Since both hearing devices are configured to provide a good DoA estimation for a source located near the frontal direction, the respective estimation in each device may be transmitted to the respective other device for generating a final DoA on each side, based on the two estimations from each device (e.g., by means of a possibly weighted average).

In an embodiment, the steps of deriving a first local input signal, a second local input signal and a first remote input signal as a part of a set of input signals, deriving a plurality of spatial feature quantities from respective pairs of input signals, and using the spatial feature quantities as an input to a neural network are performed individually in a plurality of frequency bands. In particular, the underlying microphone signals each are divided into a plurality of frequency bands for this purpose, wherein the mentioned steps are performed on the microphone signals' frequency band components. Preferably, estimating the direction of arrival of the acoustic target signal by means of the neural network is performed using the information of all available frequency bands, i.e., in a broadband manner.

Hereby, preferably, these steps are performed at least over a given frequency range, in non-adjacent frequency bands, and/or up to a frequency of 6 kHz, preferably 5 kHz, i.e., there exists a frequency range over which the mentioned steps are performed in non-adjacent frequency bands. The frequency bands may have a bandwidth in the order of magnitude of, e.g., 1 kHz, wherein the center frequencies of adjacent frequency bands may be 250 Hz apart, e.g. In particular, no frequency band with a center frequency of 0 Hz ("DC subband") is used, and/or only every second frequency band is used up to a frequency of 6 kHz, preferably up to 5 kHz. This way, redundancies are avoided and calculation resources can be used more efficiently. Due to a high overlap between adjacent frequency bands, the spatial information in two adjacent frequency bands can be considered similar, so that taking only every second frequency band for performing the aforementioned method of DoA estimation, may be sufficient.

Preferably, as a neural network, a deep neural network and/or a recurrent neural network and/or a neural circuit policy and/or a temporal convolution network is used. These types of neural networks are particularly suited for the given task.

The invention furthermore discloses a binaural hearing system, in particular a binaural hearing aid, with a first hearing instrument and a second hearing instrument. The first hearing instrument contains at least a first local microphone and a second local microphone, and the second hearing instrument contains at least a first remote microphone. The binaural hearing instrument further contains a neural network, and the binaural hearing system is configured to perform the method described above.

The binaural hearing system according to the invention shares the advantages of the method for detecting a DoA according to the invention. Particular assets of the method and of its embodiments may be transferred, in an analogous way, to the binaural hearing system and its embodiments, and vice versa.

Other features which are considered as characteristic for the invention are set forth in the appended claims.

Although the invention is illustrated and described herein as embodied in a method for detecting a direction of arrival of an acoustic target signal, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE FIGURES

Parts and variables corresponding to one another are provided with the same reference numerals in each case of occurrence for all figures.

DETAILED DESCRIPTION OF THE INVENTION

Figure 1:
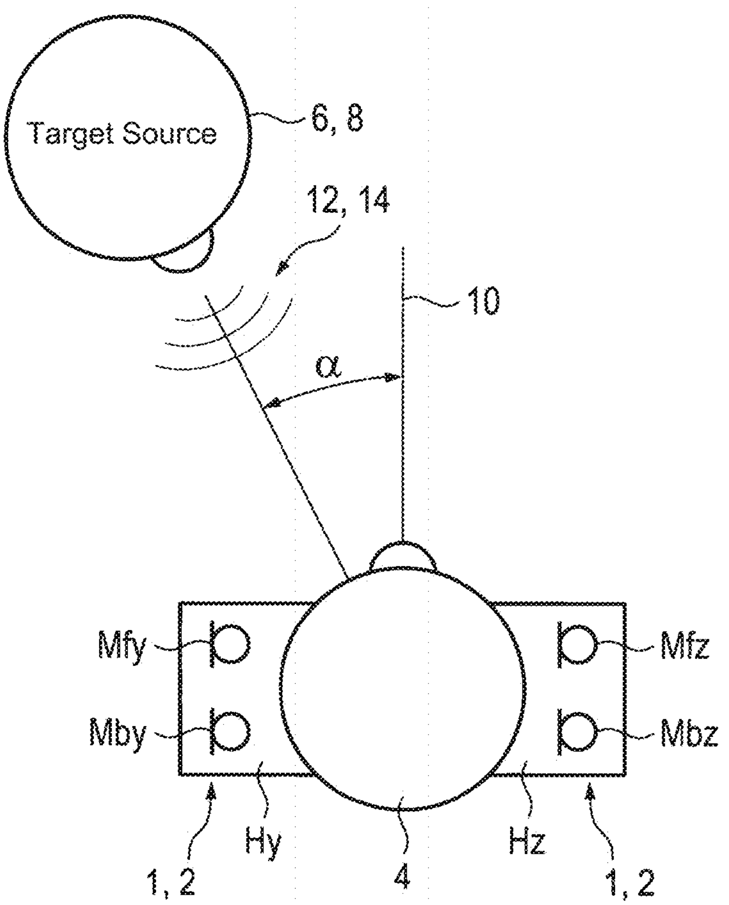
FIG. 1 is a diagrammatic, top view of a binaural hearing aid with two hearing instruments in a hearing situation with a target source.

Referring now to the figures of the drawings in detail and first, particularly to FIG. 1 thereof, there is shown a schematic top view of a binaural hearing system 1. The binaural hearing system 1 is given by a binaural hearing aid 2, which is worn by a user 4, and contains a first hearing instrument Hy (worn at the left ear of the user 4 in the present embodiment) and a second hearing instrument Hz (worn at the right ear of the user 4 in the present embodiment). The first hearing instrument contains two microphones Mfy, Mby, while the second hearing instrument contains two microphones Mfz, Mbz (the indices f, b denote "front" and "back" position in the respective hearing instrument, when properly worn as specified).

In the hearing situation depicted in FIG. 1, a target source 6 given by a target speaker 8 is located in a direction of arrival α slightly to the left of a frontal direction 10 of the user 4. A speech 12 of the target speaker 8 constitutes an acoustic target signal 14 for the binaural hearing aid 2. In order to efficiently enhance this target signal 14, the DoA, i.e., the direction α is to be determined by the signal processing of the binaural hearing aid 2.

Figure 2:
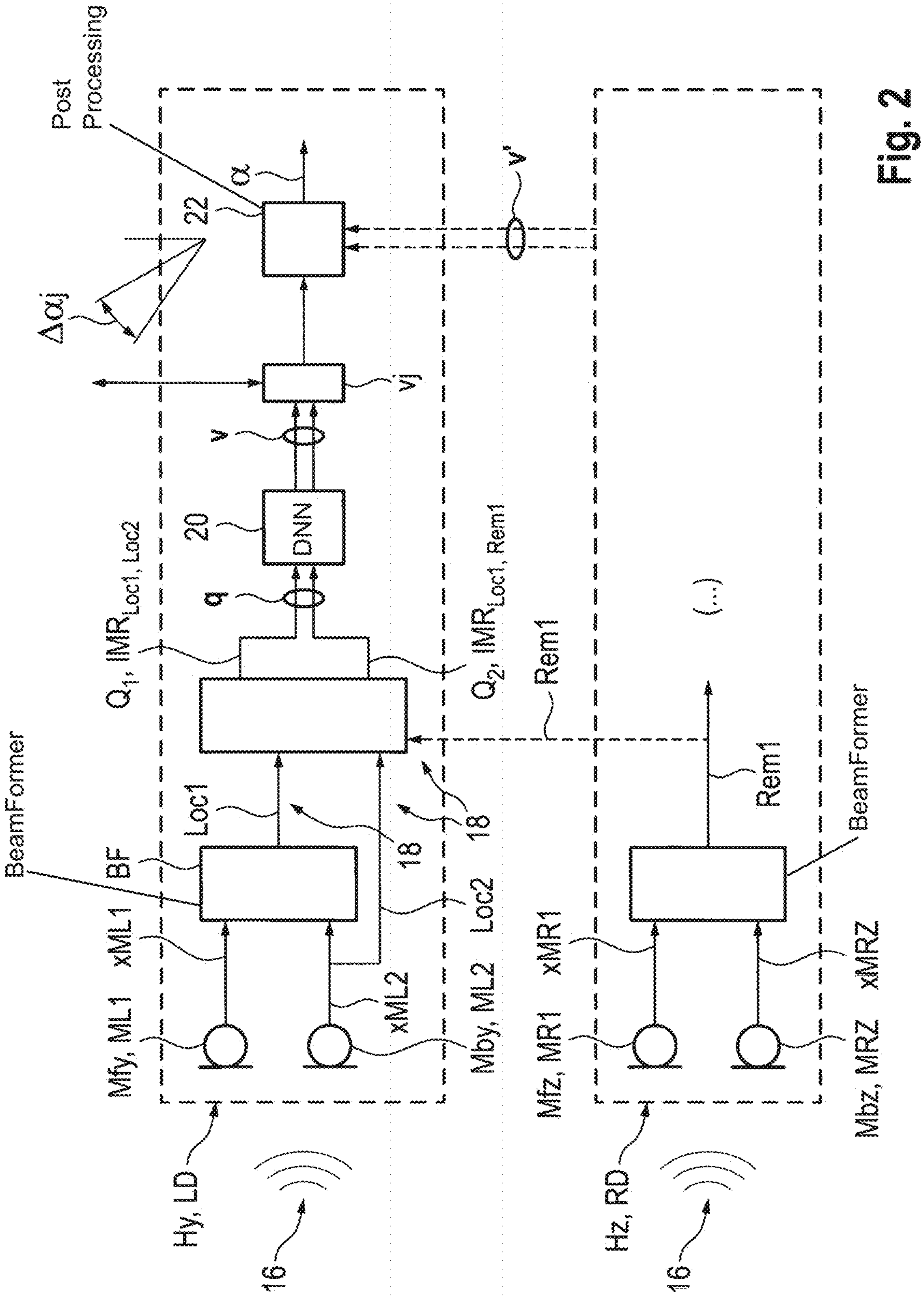
FIG. 2 is a block diagram showing a method for estimating, by means of the binaural hearing aid's microphones, a DoA of the target source in the hearing situation of FIG. 1.

FIG. 2 shows a block diagram of a method for estimating the DoA α of the acoustic target signal 14 shown in FIG. 1. As the method may be performed in an essentially symmetrical way in both hearing instruments Hy, Hz, but with a different signal processing of the signal of the corresponding hearing instrument (e.g. Hy) and the signal transmitted from the respective other hearing instrument (e.g. Hz), a change in the notation will be introduced for the present embodiment of the method, in which the main signal processing is performed in the first hearing instrument Hy (worn by the user 4 on his left ear). For the present embodiment of the method, the first hearing instrument Hy will be taken as a local device LD, while the second hearing instrument Hz will be taken as a remote device RD.

The two microphones Mfy, Mby of the first hearing device Hy are now denoted as the first local microphone ML1 and the second local microphone ML2, the two microphones Mfz, Mbz of first hearing device Hz are now denoted as the first remote microphone MR1 and the second remote microphone MR2.

The first and second local and remote microphones ML1, ML2, MR1, MR2 generate respective first and second local and remote microphone signals xML1, xML2, xMR1, xMR2 from an environment sound 16 containing the acoustic target signal 14 shown in FIG. 1 (the acoustic target signal 14 is not shown in FIG. 2). Each of the first and second local and remote microphone signals xML1, xML2, xMR1, xMR2 are split into a plurality of frequency bands by means of respective filter banks (not shown; e.g., 48-channel filter bank). For the signal processing steps described below, only every second frequency band is used up to a threshold frequency of 5 kHz (the DC frequency band is discarded, as well as frequency bands above the threshold frequency).

From the first and second local microphone signals xML1, xML2, i.e., from their respective sub-band signals, a first local input signal Loc1 is generated in each of the relevant frequency bands by means of a beamformer BF, in a way yet to be described. Furthermore, the sub-band signals of the second local microphone signal xML2 (corresponding to the "back" microphone Mby/ML2 of the local device LD) are taken as a second local input signal Loc2, i.e., in each frequency band that is used, the signal components of the second local microphone signal xML2 are used as the second local input signal Loc2. Finally, from the first and second remote microphone signals xMR1, xMR2, a first remote input signal Rem1 is generated frequency-bandwise in the remote device RD by means of beamforming, in a similar way as the first local input signal Loc1, and is transmitted to the local device LD. Then, for the method performed in the local device LD, first and second local input signals Loc1, Loc2 and the first remote input signal Rem1 constitute the set 18 of input signals (for embodiments with further local input signals, these also form part of the set 18 of input signals). For a symmetrical implementation of the signal processing steps implemented in the local device LD as shown in FIG. 2, the second remote microphone signal xMR2 (not shown; corresponding to the "back" microphone Mbz/MR2 of the remote device RD) may be taken as a second remote input signal Rem2.

Then, different pairs of input signals out of the set 18 of input signals are then used for deriving a plurality of corresponding spatial feature quantities $Q_1$, $Q_2$ indicative of a spatial relation between the respective input signals involved. As spatial feature quantities $Q_1$, $Q_2$, the so-called intra-microphone responses IMR (c.f. equation (i)) between the two input signals of the respective pair are calculated. To this end, an intra-microphone response $IMR_{Loc1,\ Loc2}(=Q_1)$ for the pair of the first and second local input signal is calculated, and another intra-microphone response $IMR_{Loc1,\ Rem1}(=Q_2)$ for the pair of the first local and first remote input signal is calculated.

These spatial feature quantities $Q_1$, $Q_2$ (represented as a vector q of their respective real and imaginary parts) are then used as an input for a deep neural network (DNN) 20. The DNN 20, e.g., in the present case may have a Recurrent Neural Network ("RNN") or Network Circuit Policy ("NCP") or a Temporal Convolutional Network ("TCN") architecture.

The DNN 20 is trained to output a vector v, its entries $v_j$ being probabilities for the DoA α of the acoustic target signal 14 being located in a certain angular range $\Delta\alpha_j$ with respect to the frontal direction 10 in FIG. 1. The angular ranges $\Delta\alpha_j$ preferably may have a width of 5°. Thereby, the angular ranges $\Delta\alpha_j$ in the present embodiment do not fully span the entire space (360°), but rather the frontal 90°-quadrant at the ear at which the local device is worn (i.e., the frontal left quadrant for the local device LD being worn at the left ear), plus a certain overshoot (in the order of 10° or 15°). For example, for the local device LD being worn at the left ear, $$v_j = P(\alpha \in \Delta\alpha_j), \tag{ii}$$

$$\Delta\alpha_j = [15^\circ - j\cdot 5^\circ,\ 15^\circ - (j-1)\cdot 5^\circ],\ j = 1 \ldots 24, \tag{a)}$$

with $P(\alpha\in\Delta\alpha_j)$ being the probability of the DoA α falling into the particular angular range $\Delta\alpha_j$. Note that most of the angular ranges cover negative angles (the left 90°-quadrant by convention covers negative angles). It is very important noting that the probabilities $P(\alpha\in\Delta\alpha_j)$ are not normalized to a sum of 1 over the angular ranges $\Delta\alpha_j$, since there may be more than one acoustic target signal 14. Rather, the probabilities $P(\alpha\in\Delta\alpha_j)$ are to be taken as the confidence of the prediction in each angular range $\Delta\alpha_j$, i.e., $P(\alpha\in\Delta\alpha_j)=0$ means that the DNN 20 excludes with absolute security that any acoustic target signal is present in the corresponding angular range $\Delta\alpha_j$, and $P(\alpha\in\Delta\alpha_j)=1$ means that the DNN 20 concludes with absolute security that an acoustic target signal is present in the corresponding angular range $\Delta\alpha_j$. By means of post-processing such as temporal smoothing, the DoA α for the estimation performed in the local device LD may be obtained from the vector v.

Furthermore, another vector v' may be transmitted from the remote device RD to the local device (double-dashed arrow). Such a vector v' may contain estimations of probabilities, performed in the remote device RD, for the DoA α falling into a particular angular range $\Delta\alpha_j$ in the respective "other" frontal quadrant (i.e., frontal quadrant of the ear at which the remote device is worn, plus an additional overshoot of 10° to 15°). These estimations are performed in the remote device RD by means of the first local input signal Loc1, the first remote input signal Rem1 and a second remote input signal (not shown), given by the second remote microphone signal xMR2, in an analogous manner to the way described above for the local device LD. For the overlapping region of the two estimations (i.e., ±10° to ±15° around the frontal direction 10), the respective entries of the vectors v and v' may be averaged in order to obtain the final estimation result (or the maximum of the two values may be kept). The vector v (and possibly the vector v') may be subject to a post-processing 22 for obtaining, by the local device LD, the final DoA α in the frontal hemisphere.

Figure 3:
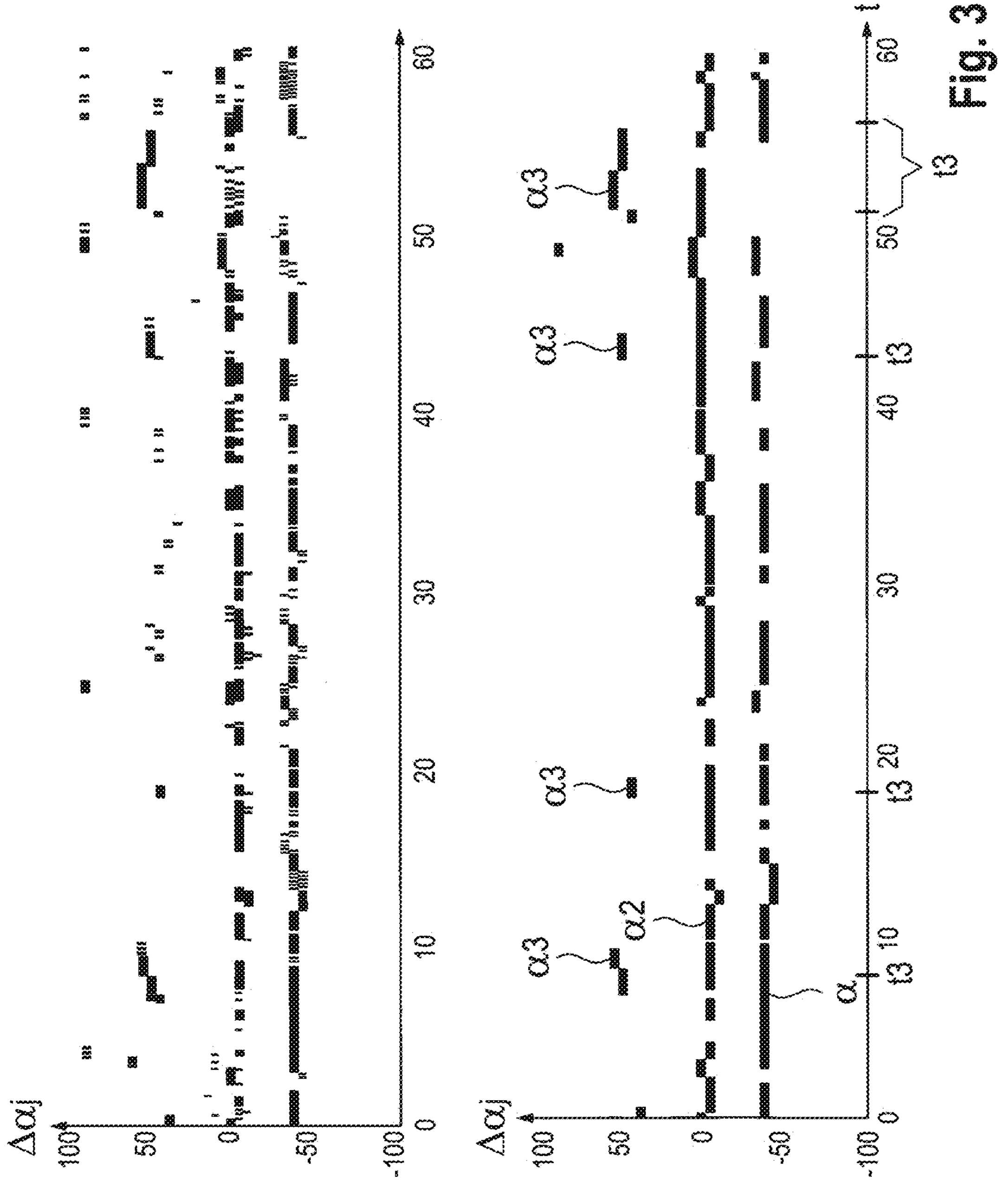
FIG. 3 schematically shows a temporal evolution of the raw DoA estimates of the method of FIG. 2, and the corresponding temporal evolution of a post-processed DoA.

The post-processing 22 of the vector v (and possibly the vector v') may comprise temporal smoothing. Such a post-processing is shown in FIG. 3. The upper image shows the temporal evolution of the direct entries of the vectors v and v' (in the overlapping region of −15° to +15°, the overlapping entries $v_j$, $v_j'$ are averaged, or their maximum is taken), i.e., the respective probabilities for finding a target signal 14 in the corresponding angular range $\Delta\alpha_j$. In the lower image, temporal smoothing has been applied to the entries of the vectors v and v', so that the DoA α is much better defined. Note that for most of the time t, there are two acoustic target signals present, and hence, not only one DoA α, but also a second DoA α2 (corresponding to a possible cross-talk of two speakers close to the user) is recognized. At time instants t3, a third speaker also starts talking, such that a third DoA α3 is recognized. Note that taking into account the vector v', transmitted from the remote device RD, for the estimation performed in the local device LD is optional. The DoA α, as well as the second and third DoA α2, α3 may vary in the sense that at certain times, the respective DoA is detected in the adjacent angular range $\Delta\alpha_{j\pm1}$. This may be due to movements of the corresponding target signal source (e.g., a slight change of position of a speaker), or also due to a slight change of position/orientation of the user 4.

Figure 4:
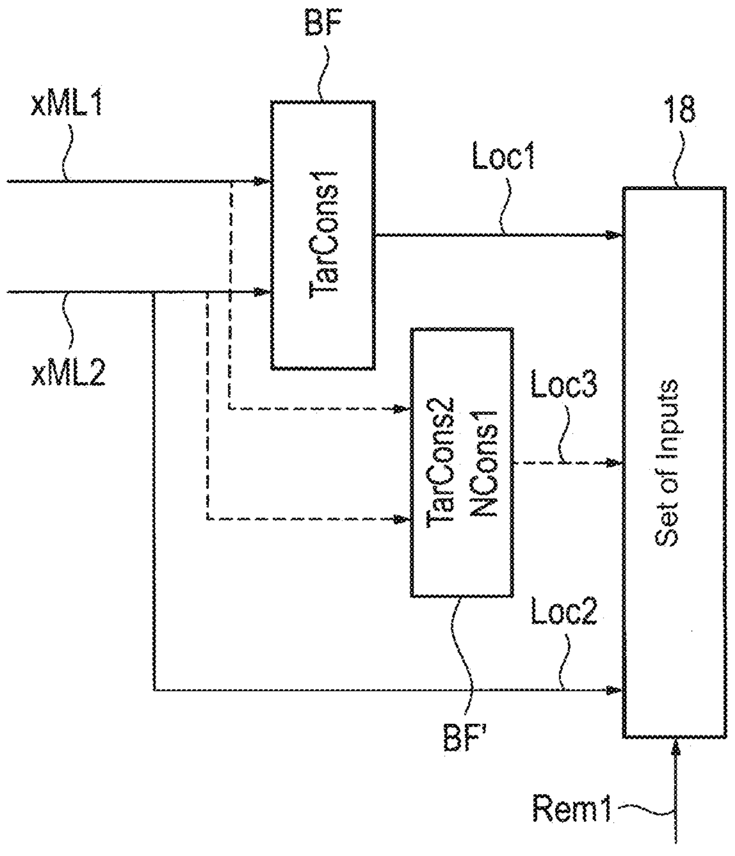
FIG. 4 schematically shows, in a section of a block diagram, the step of spatial feature extraction for the method according to FIG. 2.

FIG. 4 shows a sectional view of a schematical block diagram for the step of spatial feature extraction in the method according to FIG. 2. The first and second local microphone signals xML1, xML2 are used to generate the first local input signal Loc1, by means of a beamformer BF which uses a first target constraint TarCons1, such as an attenuation of 0 dB at an angle of 0°. As shown in FIG. 2, furthermore, the second local microphone signal xML2 is used as the second local input signal Loc2. The first remote input signal Rem1 is generated in the remote device RD in a similar way as the first local input signal Loc1, and is transmitted from the remote device RD to the local device LD. These input signals form the set 18 of input signals. However, the set 18 of input signals also may further comprise a third local input signal Loc3, generated from the first and second local microphone signal xML1, xML2 in another beamformer BF' (dashed box and arrows). The other beamformer BF' may use a second target constraint TarCons2, such as an attenuation of 0 dB at an angle of 15° (or at any integer non-zero multiple of 15°, such as 45° or 90°), and possibly, also a first noise constraint NCons1, such as a total attenuation at a given null direction (to be chosen, e.g., out of integer multiples of 15° other than the second target constraint TarCons2). Further local input signals, to be constructed by similar beamforming and varying target and/or noise constraints, are possible for the set 18 of input signals.

The beamforming in the beamformer BF may be performed as a so-called minimum variance distortionless response (MVDR) beamformer with a given "steering" direction $\theta_0$ (e.g., the frontal direction). Without loss of generality, this is described below for beamforming with two local microphones, but the method is applicable to an arbitrary number of microphones (local or remote). Then, a constant diffuse noise correlation matrix may be estimated from anechoic head related transfer functions $d(f, \theta)=(d_1, d_2)^T(f, \theta)$(f being the frequency index) as $$R(f) = \frac{1}{N_\theta}\sum_\theta d(f, \theta)d^H(f, \theta).$$

The head related transfer function $d_1(f, \theta)$ denotes the transfer function for a sound with frequency f, originating from an angle θ and propagating towards the first local microphone ML1. The sum is performed over a discrete set of a total of $N_\theta$ angles which are spanning the entire space. The weights $w(f)=(w_1, w_2)^T(f)$ of the beamformer BF in FIG. 4, i.e., the frequency-bandwise coefficients for the first and second local microphone signal xML1, xML2, can then be derived as $$w(f) = \frac{(R(f) + \mu I)^{-1}d(f, \theta_0)}{d^H(f, \theta_0)(R(f) + \mu I)^{-1}d(f, \theta_0)}$$

with $\theta_0$ being the angle corresponding to the first target constraint and μ is a small numerical value for regularization.

Figure 5:
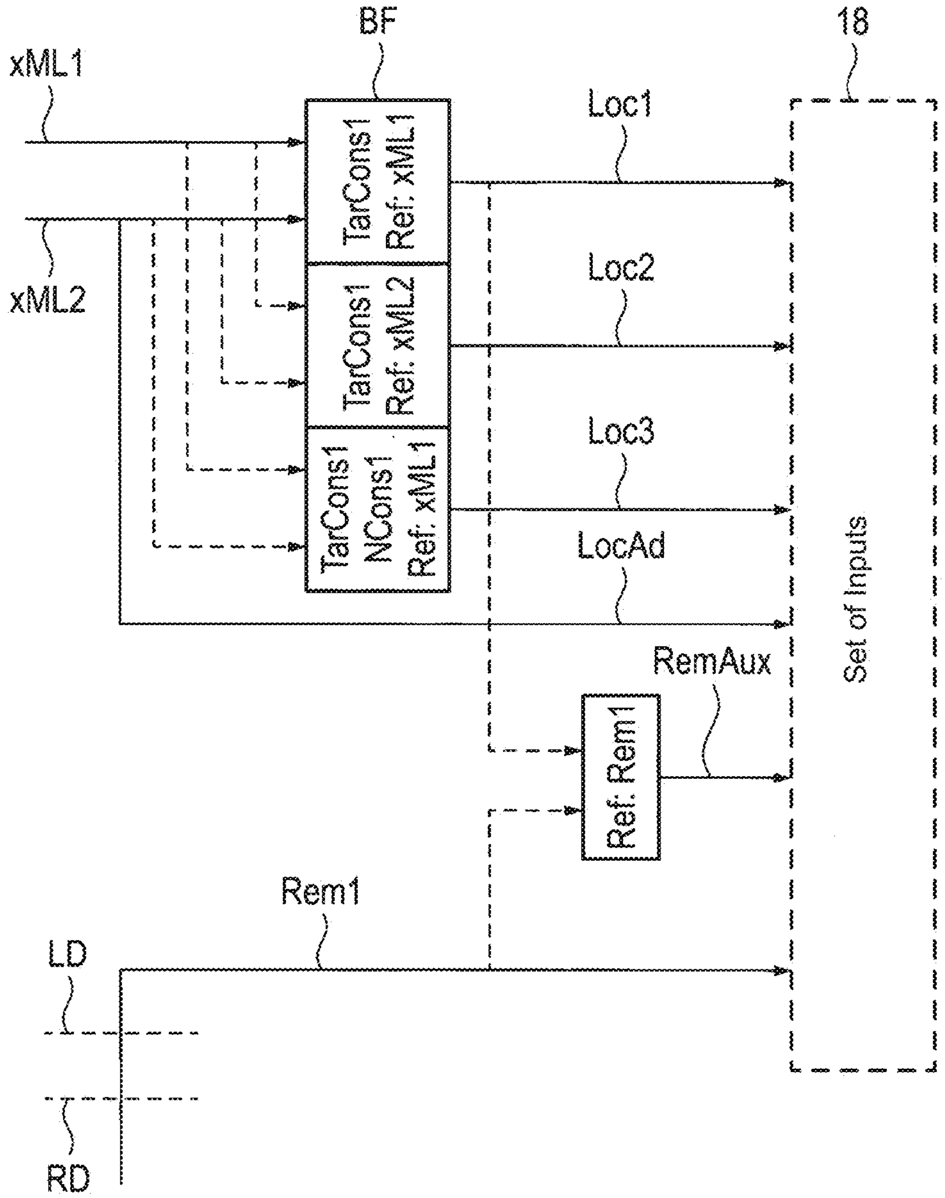
FIG. 5 a block diagram for implementing the step of spatial feature extraction in an alternative embodiment to FIG. 4.

FIG. 5, as a sectional view of a schematical block diagram, shows an alternative embodiment to the step of spatial feature extraction shown in FIG. 4. The first and second local microphone signals xML1, xML2 are used to generate the first local input signal Loc1, by means of a beamformer BF which uses a first target constraint TarCons1, such as an attenuation of 0 dB at an angle of 0°. In the generation of the first local input signal Loc1, the first local microphone signal xML1 is used as a reference signal. Furthermore, the first and second local microphone signals xML1, xML2 are used to generate the second local input signal Loc2, in a similar way as the first local input signal Loc1 (in particular, with the first target constraint TarCons1). However, now the second local microphone signal xML2 is used as a reference signal.

The third local input signal Loc3 is generated, in an analogous way as shown in FIG. 4, from the first and second local microphone signal xML1, xML2, and using a second target constraint TarCons2 (such as an attenuation of 0 dB at an angle of 45° or 90° or another integer multiple of 15°), and a first noise constraint NCons1. Just like in the generation of the first local input signal Loc1, for the third local input signal Loc3, the first local microphone signal xML1 is used as a reference signal. A fourth local input signal (not shown) might be generated in a similar way as the third local input signal Loc3, but using the second local microphone signal xML1 as a reference signal (compare the relation between the first and second local input signal Loc1, Loc2 in the embodiment of FIG. 5).

Furthermore, the second local microphone signal xML2 can be used as an additional local input signal LocAd.

Just as in the embodiment shown in FIG. 4, the first remote input signal Rem1 is generated in the remote device RD in a similar way as the first local input signal Loc1, and is transmitted from the remote device RD to the local device LD. The first remote input signal Rem1 itself forms part of the set 18 of input signals. However, the first remote input signal Rem1 is also used together with the first local input signal Loc1 to form an auxiliary remote input signal RemAux by means of beamforming, preferably using the first remote input signal Rem1 as a reference signal. However, also the first local input signal Loc1 may be taken as reference signal. Further similar auxiliary remote input signals (not shown), to be also part of the set (18) of input signals, may be generated in the local device LD by means of the first remote input signal Rem1 and other local input signals such as the third local input signal (Loc3).

Then, the spatial feature extraction is performed on pairs of input signals out of the set (18) of input signals, as shown in FIG. 4.

Even though the invention has been illustrated and described in detail with help of a preferred embodiment example, the invention is not restricted by this example. Other variations can be derived by a person skilled in the art without leaving the extent of protection of this invention.

The following is a summary list of reference numerals and the corresponding structure used in the above description of the invention:

1 binaural hearing system
2 binaural hearing aid
4 user
6 target source
8 target speaker
10 frontal direction 12 speech
14 acoustic target signal
16 environment sound
18 set (of input signals)
20 DNN
22 post-processing
BF beamformer
BF' other beamformer
Hy, Hz first/second hearing instrument
IMR intra-microphone response
LD local device
Loc1/2 first/second local input signal
Loc3 third input signal
LocAd additional input signal
Mfy, Mby microphones (of the first hearing instrument)
Mfz, Mbz microphones (of the second hearing instrument)
ML1/2 first/second local microphone
MR1/2 first/second remote microphone
NCons1 first noise constraint
RD remote device
Rem1 first remote input signal
RemAux auxiliary remote input signal
$Q_{1/2}$ spatial feature quantity
q vector (input to the DNN)
t time
t3 time instant
TarCons1/2 first/second target constraint
v, v' vector (output of the DNN)
xML1/2 first/second local microphone signal
xMR1/2 first/second remote microphone signal
α DOA
α2, α3 second/third DoA
$\Delta\alpha_j$ angular range

The invention claimed is:

1. A method for detecting a direction of arrival of an acoustic target signal by use of a plurality of microphones, the microphones being distributed over a first hearing instrument of a binaural hearing system as a local device and a second hearing instrument of the binaural hearing system as a remote device, the local device containing at least a first local microphone and a second local microphone, and the remote device containing at least a first remote microphone, each of the microphones configured to generate a corresponding microphone signal from an environment sound, respectively, the method comprises the steps of:
   - deriving a first local input signal by means of a first local microphone signal and a second local microphone signal;
   - deriving a second local input signal by means of the first local microphone signal and/or the second local microphone signal;
   - deriving a first remote input signal by means of at least a first remote microphone signal, the first local input signal, the second local input signal and the first remote input signal forming a part of a set of input signals;
   - deriving a plurality of spatial feature quantities, the spatial feature quantities each being derived from different respective pairs out of the set of input signals, and being indicative of a spatial relation between two corresponding ones of the input signals, deriving each of the spatial feature quantities from a respective pair out of the set of input signals by a same mathematical relation and/or algorithm, varying the respective pairs of input signals for different said spatial feature quantities;
   - using the spatial feature quantities as an input to a neural network;
   - estimating, by means of the neural network, the direction of arrival of the acoustic target signal; and
   - wherein as the spatial feature quantities, corresponding intra-microphone responses between the respective two input signals out of the set of input signals are derived, each of the intra-microphone responses being a ratio of cross power spectral densities of an underlying pair of the input signals and of an auto power spectral density of one out of the pair of input signals, or a ratio of cross-correlations of the underlying pair of input signals and of an auto correlation of one out of the pair of input signals.

2. The method according to claim 1, wherein an output of the neural network is a vector, each vector component corresponding to a different angular range.

3. The method according to claim 2, wherein each vector entry corresponds to a probability of a sound source of the acoustic target signal being present in a respective angular range.

4. The method according to claim 1, which further comprises:
   - deriving the first local input signal from the first local microphone signal and the second local microphone signal by means of a beamformer; and/or
   - generating the second local input signal either from the first local microphone signal or from the second local microphone signal.

5. The method according to claim 4, which further comprises:
   - deriving the first local input signal from the first local microphone signal and the second local microphone signal using the first local microphone signal as a reference for beamforming performed in the beamformer; and
   - deriving the second local input signal or a third local input signal from the first local microphone signal and the second local microphone signal by means of another beamformer using the second local microphone signal as a reference for beamforming performed in the another beamformer.

6. The method according to claim 4, which further comprises:
   - deriving the first local input signal from the first local microphone signal and the second local microphone signal by means of the beamformer applying a first target constraint; and/or
   - deriving a third local input signal, forming part of the set of input signals, from the first local microphone signal and the second local microphone signal by means of another beamformer applying a second target constraint and/or a first noise constraint.

7. The method according to claim 1, wherein the remote device further has a second remote microphone configured to generate a second remote microphone signal from the environment sound, the method further comprises:
   - deriving the first remote input signal from the first local microphone signal and the second remote microphone signal by means of a beamformer.

8. The method according to claim 2, which further comprises deriving the first remote input signal and/or an auxiliary remote input signal, the auxiliary remote input signal forming part of the set of input signals, in the local device by using at least the first remote microphone signal and the first local microphone signal.

9. The method according to claim 8, which further comprises:

transmitting the first remote input signal or the first remote microphone signal from the remote device to the local device; and/or implementing the neural network in the local device.

10. The method according to claim 9, which further comprises:

estimating the direction of arrival of the acoustic target signal in the local device;

transmitting the first local input signal and/or the first local microphone signal from the local device to the remote device;

deriving a second remote input signal by means of the first local microphone signal and/or the second remote microphone signal;

estimating the direction of arrival of the acoustic target signal in the remote device by means of the first and second remote input signal and the first local input signal and/or the auxiliary local input signal derived in the remote device by using the first local microphone signal and the first remote microphone signal;

transmitting an estimation performed in the remote device to the local device; and determining a final direction of arrival based on the estimation performed in the local device and the estimation performed in the remote device.

11. The method according to claim 1, wherein the steps of:

the deriving of the first local input signal, the second local input signal and the first remote input signal as the part of the set of input signals;

the deriving the plurality of spatial feature quantities from the respective pairs of input signals; and the using of said spatial feature quantities as the input to the neural network;

are performed individually in a plurality of frequency bands.

12. The method according to claim 11, wherein the steps, at least over a frequency range, are performed in non-adjacent frequency bands, and/or up to a frequency of 6 KHz.

13. The method according to claim 1, which further comprises using a deep neural network, and/or a recurrent neural network, and/or a neural circuit policy, and/or a temporal convolution network as the neural network.

14. A binaural hearing system, comprising:

hearing instruments including a first hearing instrument and a second hearing instrument, said first hearing instrument having at least a first local microphone and a second local microphone, and said second hearing instrument having at least a first remote microphone;

a neural network; and said binaural hearing system configured to perform the method according claim 1.

* * * * *